United States Patent
Suor et al.

(10) Patent No.: US 12,434,404 B1
(45) Date of Patent: Oct. 7, 2025

(54) SYSTEMS AND METHODS FOR THE PRODUCTION OF GLULAM AND SPLIT-LAM WOOD COMPOSITES

(71) Applicants: Stiles Machinery, Inc., Grand Rapids, MI (US); System TM A/S, Odder (DK)

(72) Inventors: Russell P. Suor, Alto, MI (US); Thomas Høeg Olesen, Silkeborg (DK)

(73) Assignee: Stiles Machinery, Inc., Grand Rapids, MI (US)

(*) Notice: Subject to any disclaimer, the term of this patent is extended or adjusted under 35 U.S.C. 154(b) by 183 days.

(21) Appl. No.: 17/990,372

(22) Filed: Nov. 18, 2022

Related U.S. Application Data

(60) Provisional application No. 63/280,789, filed on Nov. 18, 2021.

(51) Int. Cl.
  *B27M 3/00* (2006.01)
  *G05B 19/418* (2006.01)

(52) U.S. Cl.
  CPC ..... *B27M 3/0053* (2013.01); *G05B 19/41805* (2013.01); *G05B 19/4188* (2013.01)

(58) Field of Classification Search
  CPC ............. B27M 3/0013; B27M 3/0026; B27M 3/0053; B27M 3/006; B27M 1/08
  See application file for complete search history.

(56) References Cited

U.S. PATENT DOCUMENTS

| | | |
|---|---|---|
| 6,446,412 B2 | 9/2002 | Mathis |
| 7,418,874 B2 * | 9/2008 | Leitinger ............... G01N 33/46 73/826 |
| 8,088,494 B2 * | 1/2012 | Bosson ................... B27M 1/08 428/167 |
| 8,245,741 B2 | 8/2012 | Filion et al. |
| 8,245,742 B2 | 8/2012 | Filion et al. |
| 10,131,119 B2 | 11/2018 | Freres |
| 10,464,294 B2 | 11/2019 | Freres |
| 2019/0126508 A1 | 5/2019 | Morf |

FOREIGN PATENT DOCUMENTS

| | | |
|---|---|---|
| AT | 518387 B1 | 10/2017 |
| EP | 2384383 B1 | 2/2013 |
| EP | 2251168 B1 | 7/2013 |
| EP | 3481609 A1 | 5/2019 |
| EP | 3484703 B1 | 10/2020 |
| WO | 2018006114 A1 | 1/2018 |

* cited by examiner

Primary Examiner — Matthew Katcoff
(74) Attorney, Agent, or Firm — Nyemaster Goode P.C.

(57) ABSTRACT

A method of producing a composite wood beam using a continuous wood processing subsystem that includes the steps of: analyzing a plurality of wood boards of material; transferring the analyzed wood boards to a cross-cutting saw; calculating and automatically recording in a database of a computer system the locations of joints between the sections of the plurality of wood boards of material; cutting each of a plurality of analyzed boards of an initial set of boards to produce sections of wood board to be used to produce the initial lamella of a predetermined length; calculating and automatically recording in the database of a computer system the locations of joints between the sections; and comparing the locations of the joints of the initial lamella to the locations of the joints of the subsequent lamella.

20 Claims, 12 Drawing Sheets

| | | | | | | | | | | | |
|---|---|---|---|---|---|---|---|---|---|---|---|
| | | | | | | | | BOARD THICKNESS MM | 35 35 35 35 35 35 35 35 35 35 35 | 35 35 35 35 35 35 35 35 35 35 35 | ⎫<br/>⎬ 1100<br/>⎭ |
| | | | | | | | | SIZE/SPECIES | 2X10 D.FIR ×11 | 2X10 D.FIR ×11 | |
| | | | | | | | 76 | LENGTH | 17920 ×11 | 17920 ×11 | |
| | | | | | | | | PCS | 1 1 5 5 5 1 5 1 1 1 1 | 1 1 1 1 1 1 1 1 1 1 | |
| | | | | | | | | CMP2 | 1002 1003 1004 1005 1006 1007 1008 1009 1010 1011 | 1013 1014 1015 1016 1017 1018 1019 1020 1021 1022 | |
| | | | | | | | | CMP1 | 1001 1002 1003 1004 1005 1006 1007 1008 1009 1010 | 1012 1013 1014 1015 1016 1017 1018 1019 1020 1021 | |
| | | | | | | | | ID | 2001 2002 2003 2004 2004 2004 2004 2005 2006 2007 | 2008 2009 2010 2011 2012 2013 2014 2015 2016 2017 2018 | |
| | | | | | | | | GRADE | T1 B C D D D D C B T1 | T1 B C D D D D C B T1 | |
| | | | | | | | | BOARD THICKNESS MM | 35 35 35 35 35 35 35 35 35 35 35 | 35 35 35 35 35 35 35 35 35 35 35 | |
| | | | | | | | 74 | SIZE/SPECIES | 2X8 D.FIR ×11 | 2X8 D.FIR ×11 | |
| | | | | | | | | LENGTH | 17920 ×11 | 17920 ×11 | FIG. 9 |
| | | | | | | | | PCS | 1 1 1 1 1 1 1 1 1 1 1 | 1 1 1 1 1 1 1 1 1 1 1 | |
| | | | | | | | | ID | 1001 1002 1003 1004 1005 1006 1007 1008 1009 1010 1011 | 1012 1013 1014 1015 1016 1017 1018 1019 1020 1021 1022 | |
| | | | | | | | | GRADE | T1 B C D D D D D C B T1 | T1 B C D D D D D C B T1 | |
| | | | | | LAMINATIONS | | 11 | ⎫ 110 ⎭ | 11  ⎫ 100 ⎭ | |
| | | | | | LENGTH MM | | 17920 | | 17920 | |
| | | | | | DEPTH MM | | 406.4 | | 406.4 | |
| | | | | | WIDTH MM | | 406.4 | | 406.4 | |
| 70 | | | | | | | | 4X PROJECT BEAMS | | 4X PROJECT BEAMS | |
| | | | | | GRADE | | 24F-V8 | 72 | 24F-V8 | 72 |
| | | | | | PRESSING | | 3 | | 3 | |

SYSTEMS AND METHODS FOR THE PRODUCTION OF GLULAM AND SPLIT-LAM WOOD COMPOSITES

CROSS-REFERENCE TO RELATED APPLICATION

This application claims benefit of and priority to U.S. Provisional Application No. 63/280,789, filed on Nov. 18, 2021, entitled "SYSTEMS AND METHODS FOR THE PRODUCTION OF GLULAM AND SPLITLAM WOOD COMPOSITES," the disclosure of which is hereby incorporated herein by reference in its entirety.

BACKGROUND

Structural wood beams are typically milled from a large, single piece of timber to the appropriate width, height, and length. However, it may be difficult to find timber that is large enough in all three dimensions and includes enough quality wood to serve the required structural purpose. Glued laminated timber, sometimes called glulam in short, may be used in most applications in place of single pieces of timber. A glulam is a stress-rated engineered wood beam composed of wood laminations, or "lams", that are typically bonded together with durable, moisture-resistant adhesives. The grain of the laminations runs parallel with the length of the member. Glulam is versatile, ranging from simple, straight beams to complex, curved members.

SUMMARY

One aspect of the present disclosure generally includes a method of making a composite wood beam that includes the steps of: joining a plurality of individual wood boards, typically solid wood/lumber or hardwood, in a continuous machining process to form a plurality of lamellas having at least one joint; using a computer system to create a plan for the production of the plurality of lamellas having at least one joint and the assembly of the plurality of lamellas into the composite wood beam where the joints of either vertically adjacent lamellas or both vertically and horizontally adjacent lamellas are at least a predetermined distance from one another; using the computer system to regulate the location of the at least one joint of a lamella by communicating with a saw that cuts the plurality of individual wood boards used to form a lamella and, as necessary, thereby adjusting the location of a location of a joint of a lamella of the plurality of lamellas produced by shortening the length of one or more of the plurality of individual wood boards to a shorter length than originally planned in the plan for the production and thereby revise the plan and ensure that the joints of either vertically adjacent lamellas or both vertically and horizontally adjacent lamellas are at least a predetermined distance from one another; and assembling the plurality of lamellas to form the composite wood beam.

Another aspect of the present disclosure includes a method of creating a glulam or split-lam wood beam that includes the steps of: joining a plurality of individual wood boards in a continuous machining process to form a plurality of planned lamellas having at least one joint wherein the plurality of planned lamellas include a first planned lamella and a plurality of planned lamellas produced after the first planned lamella; using a computer system to create a plan for the production and assembly of the plurality of planned lamellas and wherein the computer system is in signal communication with at least one visual scanning system that scans the location of joints of the plurality of lamellas; using the computer system to regulate the location of the at least one joint by communicating with a saw that cuts the plurality of individual wood boards and adjust the location of the at least one joint of the plurality of planned lamellas produced after the first planned lamella is produced such that each of the at least one joint of the plurality of lamellas in the glulam or split-lam beam produced from the are spaced at least a predetermined distance from one another in the vertical direction when the plurality of planned lamellas are placed on top of one another and, if the plurality of planned lamellas are placed vertically on top of one another and horizontally next to one another to form a split-lam beam; and assembling the plurality of planned lamellas to form the split-lam beam or the glulam beam.

Yet another aspect of the present disclosure is generally directed to a method of producing a composite wood beam using a continuous wood processing subsystem that includes the steps of: calculating and automatically recording in a database of a computer system the locations of joints between the sections of a plurality of wood boards to be used to produce an initial lamella prior producing the initial lamella; calculating and automatically recording in the database of a computer system the locations of joints between the sections of the plurality of wood boards to be used to produce a subsequent lamella that will be positioned adjacent the initial lamella in the composite wood beam; comparing the locations of the joints of the initial lamella to the locations of the joints of the subsequent lamella; regulating the position of the joints of the subsequent lamella to ensure that the joints of the initial lamella and the subsequent lamella are at least six inches from one another when the initial lamella and the subsequent lamella are spaced adjacent one another and adhered to one another to form the composite wood beam; and adhering the initial lamella to the subsequent lamella to form the composite wood beam. A plurality of lamellas, typically at least 10 lamellas or more may be place adjacent one another either vertically or vertically and laterally to form the glulam composite wood beam or split-lam beam of the present disclosure.

Another aspect of the present disclosure generally includes a method of producing a composite wood beam using a continuous wood processing subsystem that includes the steps of: analyzing a plurality of wood boards of material using a visual scanning camera system yielding a plurality of analyzed wood boards; transferring the analyzed wood boards to a cross-cutting saw; calculating and automatically recording in a database of a computer system the locations of joints between the sections of the to be used to produce the initial lamella prior to cutting the plurality of wood boards; cutting each of a plurality of analyzed boards of an initial set of boards with a first saw to cut out any imperfections, if present, in each of the plurality of analyzed boards and produce sections of wood board to be used to produce an initial lamella of a predetermined length corresponding to a predetermined length of the composite wood beam; calculating and automatically recording in the database of a computer system the locations of joints between the sections of the to be used to produce a subsequent lamella that will be positioned adjacent the initial lamella in the composite wood beam; comparing the locations of the joints of the initial lamella to the locations of the joints of the subsequent lamella prior to cutting an imperfection from the sections of wood boards to be used to produce the subsequent lamella; cutting each of a plurality of analyzed boards of a subsequent set of boards with the first saw to cut out any imperfections, if present, in each of the plurality of analyzed boards of the subsequent set and produce sections of wood board to be used to produce the subsequent lamella of a predetermined length corresponding to a predetermined length of the composite wood beam that will be positioned adjacent the initial lamella such that the joints between the sections to be used to produce the subsequent lamella are not within a predetermined distance from the joints between the sections of the initial lamella; and adhering the initial lamella with the subsequent lamella.

Another aspect of the present disclosure generally includes a method of producing a composite wood beam that includes the steps of: analyzing a plurality of wood boards of material using a visual scanning camera system yielding a plurality of analyzed wood boards with identified sections to be used to produce a first lamella and a second lamella; calculating and automatically recording in a database of a computer system the calculated location of joints between sections to be used to produce the first lamella after the sections to be used to produce the first lamella are cut from at least one of the plurality of analyzed wood boards; calculating and automatically recording the calculated location of joints between the sections to be used to produce the second lamella after the sections to be used to produce the second lamella are cut from at least one of the plurality of analyzed wood boards; comparing the location calculated location of the joints of the first lamella to the second lamella using the computer system and automatically adjusting at least the size of one of the sections to be used to produce the second lamella if there is an overlap of six inches or less between the calculation locations of the joints of the first lamella and the calculated joints of the second lamella such that the final locations of the joints of the section lamella do not overlap by six inches or less; transferring the analyzed wood boards to a cross-cutting saw; cutting each of the plurality of analyzed boards with a first saw to cut out any imperfections, if present, in each of the plurality of analyzed beams and produce the sections of wood board to be used to produce a first lamella of a predetermined length and the sections of wood board used to produce the second lamella of a predetermined length based upon the adjusted size of the sections to be used to produce the second lamella provided by the computer system; transferring the sections of the analyzed boards to a finger jointing system; cutting finger joints into the sections; joining the finger joints of the sections to form joined sections that together form the first lamella and the joined sections have a length of at least the predetermined length; if the joined sections have a length that is longer than the predetermined length, cutting the trailing end portion of a final section of the first lamella with a second saw to create the first lamella at the predetermined length; and adhering the second lamella to the first lamella using an adhesive.

Yet another aspect of the present disclosure generally includes a method of automatically producing a glulam or split-lam beam without human interaction that includes the steps of: tracking and the finger joint locations of each of a plurality of lamella beams that include an initial lamella and a subsequent lamella wherein the plurality of lamella beams are produced using automated woodworking machines and the tracking is done using a computer system operably and in communication with at least a wood cross cut saw; and adjusting one or more location of the finger joint locations of the plurality of lamellas other than the initial lamella using the computer system to ensure that the joints between two adjacent lamellas of the plurality of lamellas are not closer than six inches from one another.

Another aspect of the present disclosure is generally directed toward a glulam or split-lam beam having a plurality of wood beams where the wood beams are positioned in a location relative to one another chosen from the group consisting of: above, below, adjacent, and combinations thereof. At least one of the plurality of wood beams include a plurality of finger jointed board sections each having a printed line on the top surface thereof where the printed line on the top surface is spaced at a same distance from an end of each of the plurality of finger jointed board sections. Typically, the printed line of the top surface is spaced at the same distance from an end of each of the plurality of finger jointed board section of each of the plurality of wood beams.

Another aspect of the present disclosure is generally directed to A method of producing a composite wood beam that includes the steps of: analyzing a plurality of wood boards of material using a visual scanning camera system yielding a plurality of analyzed wood boards; transferring the analyzed wood boards to a cross-cutting saw; cutting each of the plurality of analyzed boards with a first saw to cut out any imperfections, if present, in each of the plurality of analyzed beams and produce sections of a first grade of wood board to be used to produce a first lamella of a predetermined length; calculating and automatically recording in a database of a computer system the location of joints between the sections to be used to produce the first lamella; transferring the sections of the analyzed boards having the same grade to a finger jointing system; cutting finger joints into the sections; joining the finger joints of the sections to form joined sections that together form the first lamella and the joined sections have a length of at least the predetermined length; if the joined sections have a length that is longer than the predetermined length, cutting the trailing end portion of a final section of the first lamella with a second saw to create the first lamella at the predetermined length; automatically recording in the database of the computer system the location of joints between sections used to produce a second lamella to be placed adjacent the first lamella and using at least one section of a second grade of wood to be used to produce a second lamella; and adhering the second lamella to the first lamella using an adhesive and wherein none of the locations of joints between the sections used to produce the first lamella are within less than six inches of the locations of joints between the sections used to produce the second lamella.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 9 is an example screenshot of a work order for creating the glulam according to an aspect of the present disclosure.

DETAILED DESCRIPTION

Figure 1:
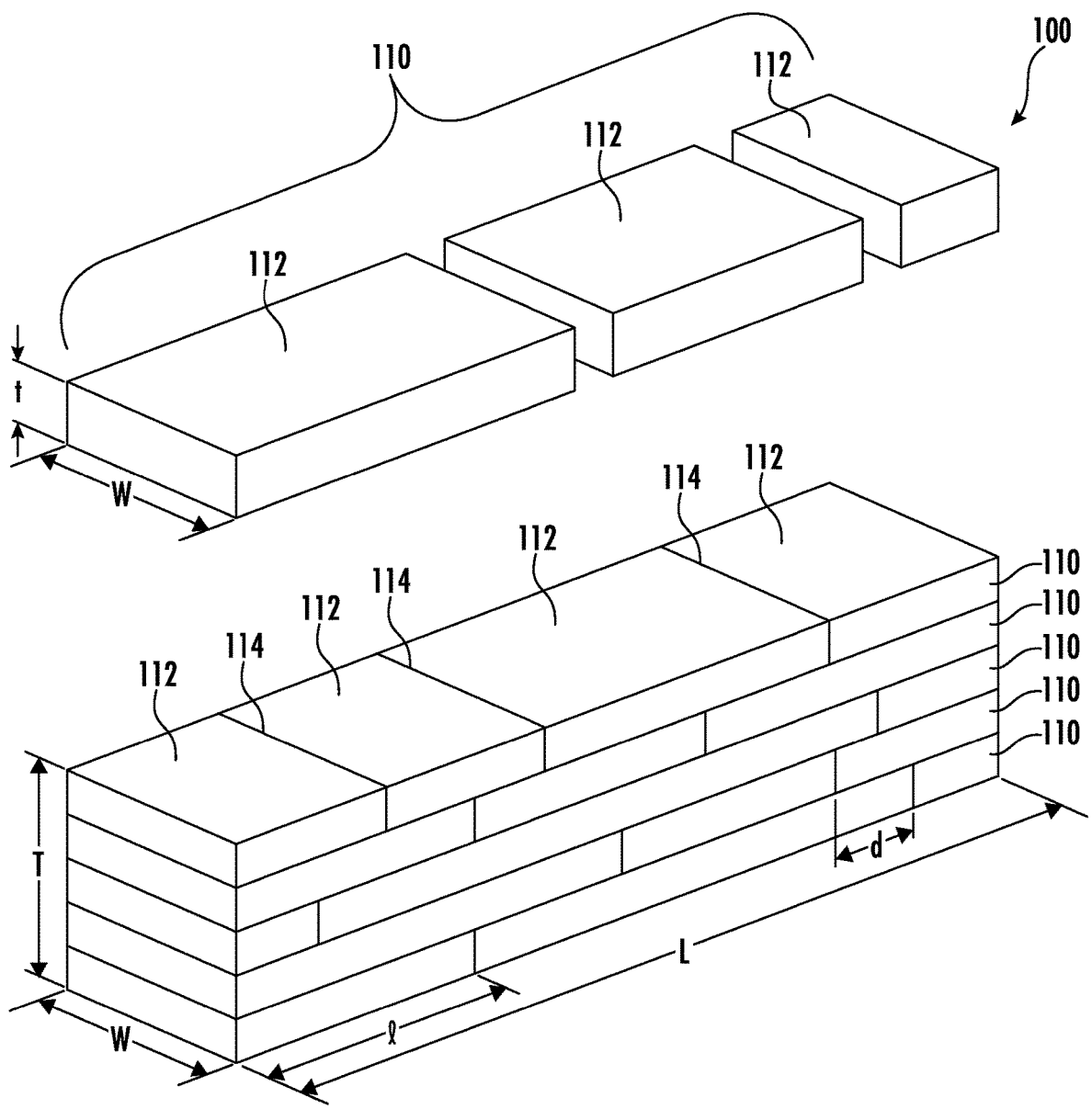
FIG. 1 is an exploded view of a glulam according to an aspect of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Composite structural wood beams may be formed from a number of different pieces of wood, each having a different length and grade (typically grade "A" or "T1" for the highest quality down to grade "D" or lower for the lowest usable quality). The overall structure of the end product typically has a number of grade "A" or "T1" pieces on the outside, grade "B" pieces inside of the grade "A" pieces, grade "C" pieces inside of the grade "B" pieces, and so on until the lowest grade pieces are the most internal.

As shown in at least FIG. 1, individual pieces of wood 112 typically have the same width or substantially the same width (within the tolerance for a given lumber piece). The width is typically defined by the desired width of the end product glulam. The pieces of wood 112 are typically shorter than the overall length of the glulam. The pieces of wood are typically a solid wood/lumber or hardwood board and not an engineered wood or wood composite such as a plywood, veneer, or other wood composite. In order to construct a glulam 100 to the desired length L, the pieces must be attached at their ends to form a lamella 110 to the desired length. This results in each lamella 110 or layer of the glulam 100 including a number of end joints 114 within the full length of the lamella 110. In order to ensure the structural integrity of the glulam 100, the end joints 114 within each lamella must be placed a linear distance (typically about six inches or greater, more typically about 7 inches or greater and most typically about 7.25 inches or greater) from the end joints of an adjacent lamella 110 of the glulam 100.

As shown in at least FIG. 2, when a beam is desired that has an overall width "W" that is wider than the width "w" of a typical piece of wood 112, which is typically a whole or partial lumber board, it may be necessary to adjoin lamellas 110 side by side as well. Since typical wood beams are not more than 12 inches wide, if a wider composite beam is desired or needed for construction, the lamellas 110 of the split-lam beams 1100 may overlap side-to-side, and must maintain similar joint overlap distances as described above between overlapping portions of the glulam. The overlap between lamellas 110 of the split-lam beam 1100 being constructed must not have overlapping joints 114 that are closer than about six inches, more typically not closer than about 7 inches or not closer than about 7.25 inches.

Referring to FIG. 1, a composite beam or glulam 100 is shown. The glulam 100 comprises a number of lamellas 110 each of a given thickness "t", typically 1½" thick (the typical thickness of a 2×4, 2×6, 2×8, 2×10, or 2×12). The number of lamellas 110 within a given glulam 100 is defined by the desired overall thickness "T" of the glulam 100. Each lamella 110 comprises a number of individual pieces of wood 112 having a width "W", which is defined by the desired width of the glulam 100. Each piece of wood 112 is some length "l", which when connected end-to-end at end joints 114 will combine to provide a full length "L" of the glulam 100.

Looking at the bottom two lamellas in FIG. 1, the end joints 114 of adjacent lamellas 110 are separated by a distance "d". The farther these end joints 114 are separated from one another in adjacent lamellas 110, the stronger the finished product glulam will be. Typically, it is desired for structural beams that these end joints 114 are separated by a distance "d", which is at least six inches in adjacent lamellas 110 along the length L of the beam 100.

Figure 2A:
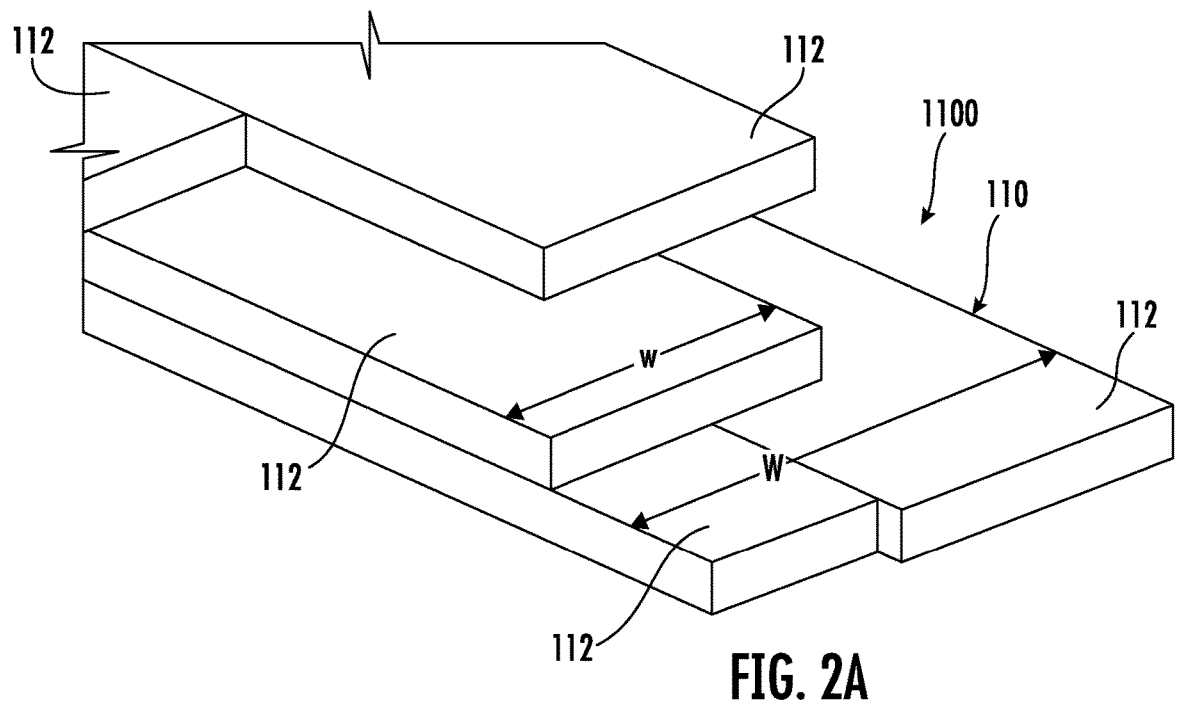
FIG. 2A is a perspective view showing a split-lam beam according to an aspect of the present disclosure.
Figure 2B:
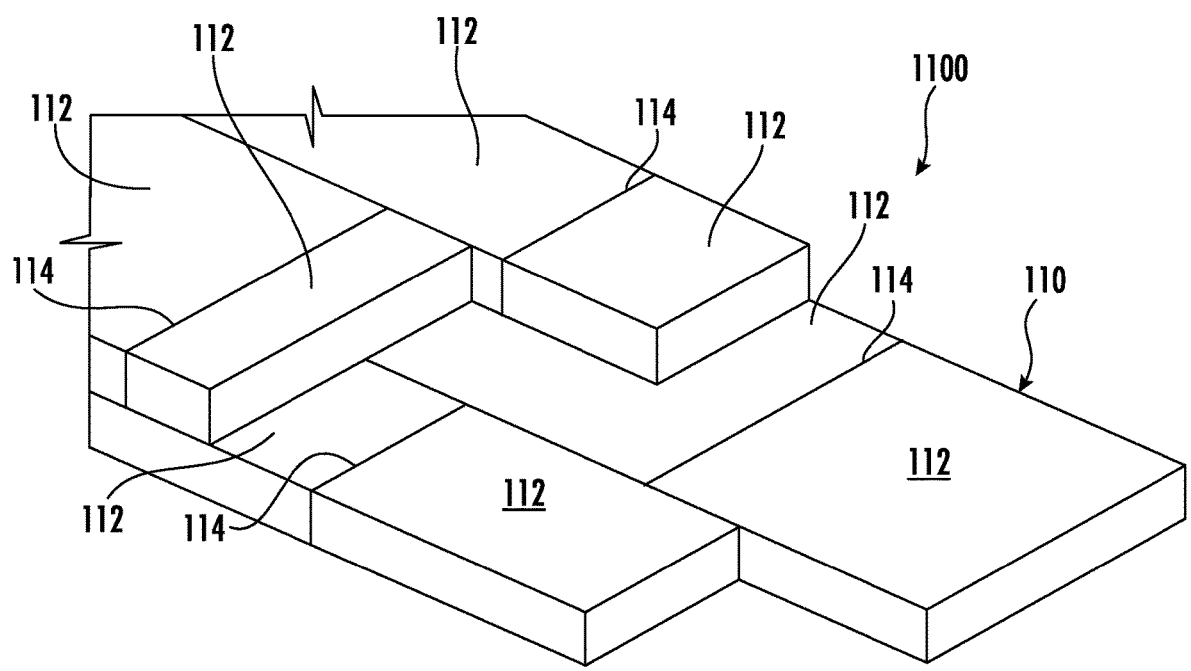
FIG. 2B is a perspective view showing a split-lam beam according to an aspect of the present disclosure.

Referring now to FIGS. 2A and 2B, a composite beam or split-lam beam 1100 is shown. The split-lam beam 1100 comprises a number of lamellas 110 each of a given thickness "t", typically 1½ or about 1½ inches thick (the typical thickness of a 2×4, 2×6, 2×8, 2×10, or 2×12). The number of lamellas 110 within a given split-lam beam 1100 is defined by the desired overall thickness "T" and the desired overall width "W" of the split-lam beam 1100. Each lamella 110 comprises a number of wood pieces 112 having a width "w" which when connected side to side will combine to provide a full width "W" of the split-lam beam 1100. Each piece of wood is some length "l", which when connected end-to-end at end joints 114 will combine to provide a full length "L" of the glulam 100.

Figure 3:
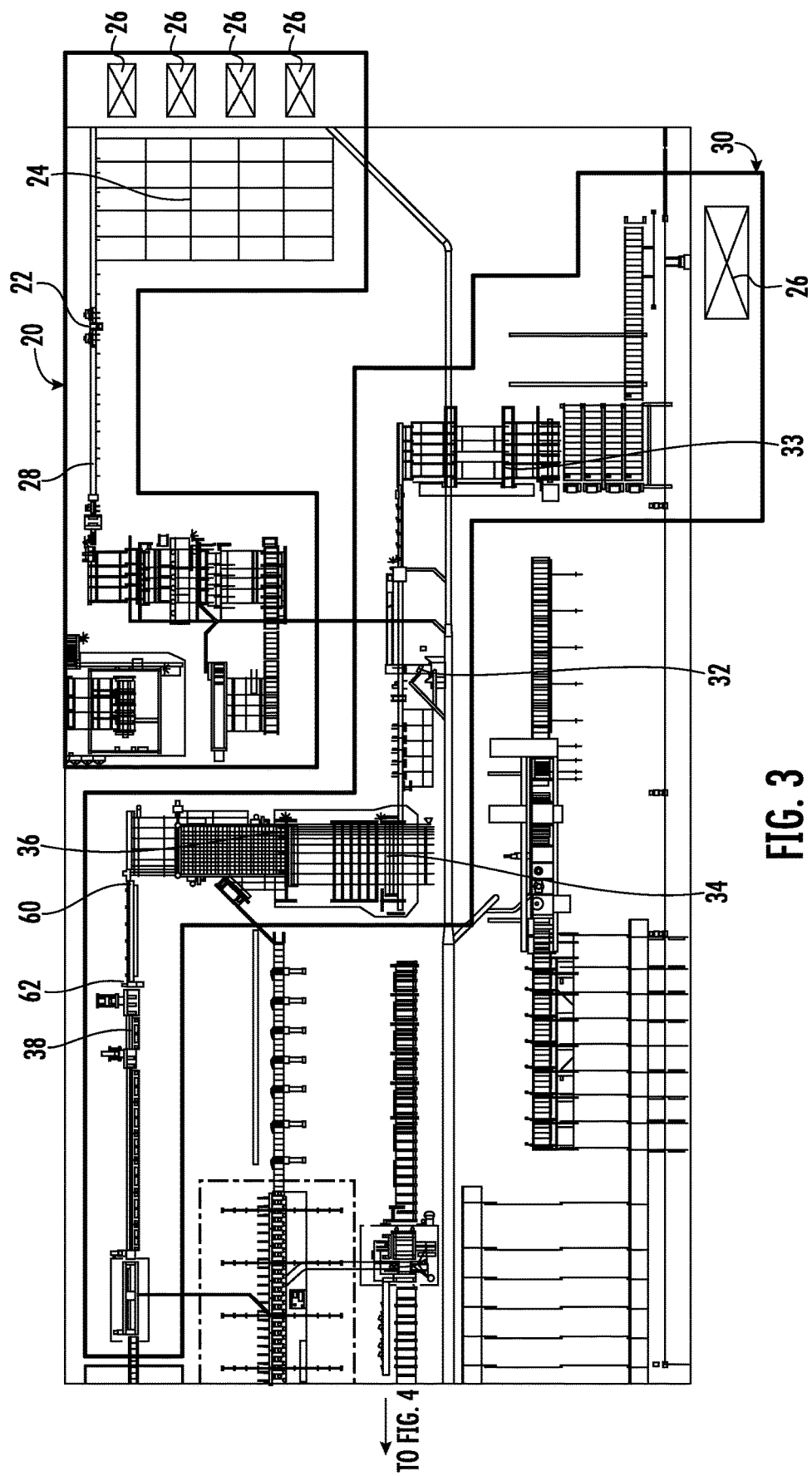
FIG. 3 is a schematic view of a portion of the line for creating the glulam according to an aspect of the present disclosure.
Figure 4:
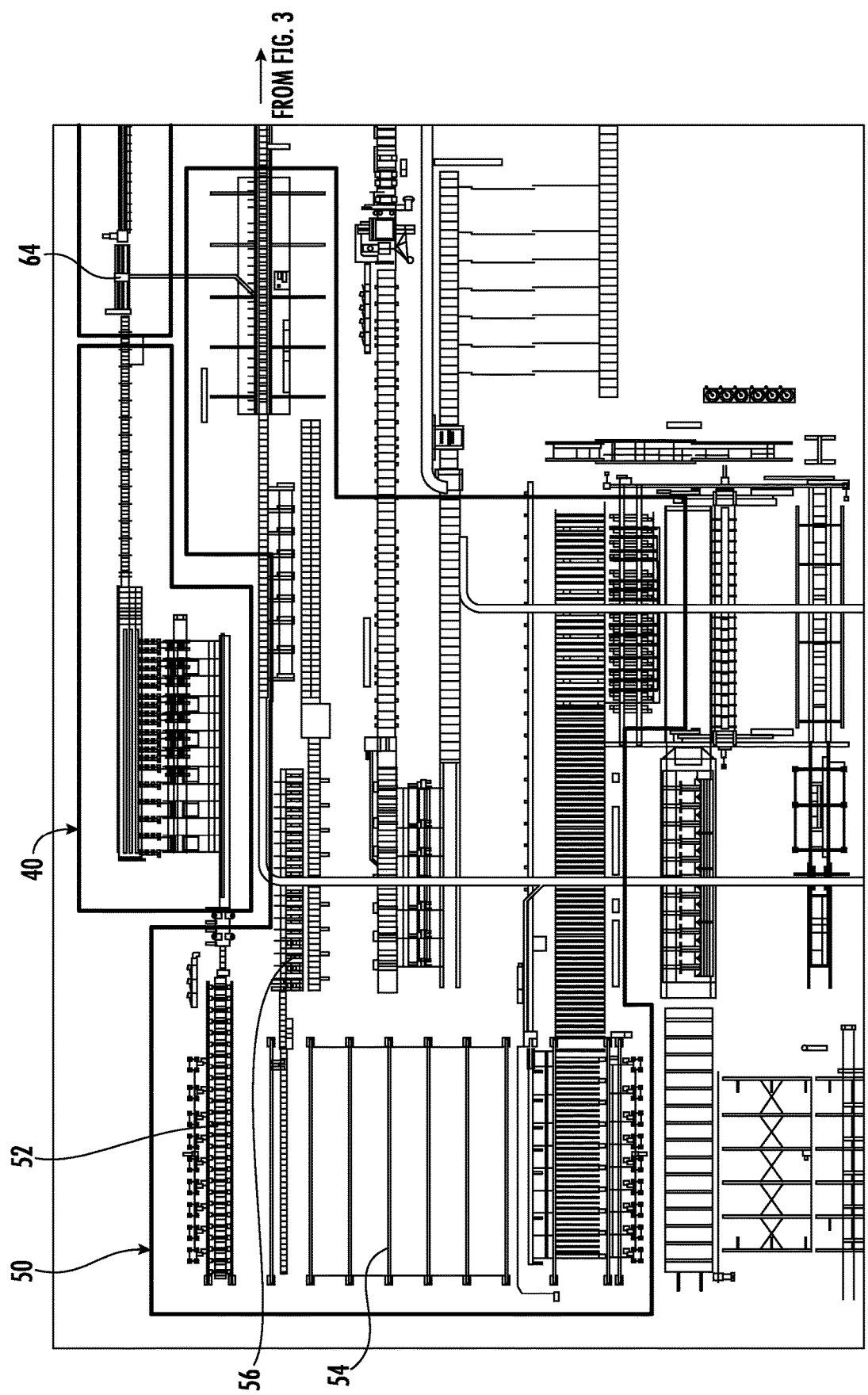
FIG. 4 is another adjoining schematic view of a portion of the line for creating the glulam according to an aspect of the present disclosure.

An exemplary layout of processing systems of the present disclosure is shown in FIGS. 3-4 an example of a line layout is shown. An exemplary overall processing line is typically separated into a grading section 20, a cross-cut section 30, a finger jointing section 40, and lamella storage and retrieval section 50. As will be described in more detail below, the grading section 20 grades and separates the lumber into its constituent grades, A (or T1) through D (although more or fewer grades may be used). The lumber is then placed into bins with similarly graded lumber. These holding bins are then transferred to the cross-cut section 30, where the lumber is cut to the desired length for the given lamella 110 that the piece of wood 112 (piece of lumber) is scheduled for, and unusable portions of the lumber are cut away. The board is then transferred to the finger jointing section 40, where finger joints are cut into the ends of the piece of wood 112 for joining with other pieces of wood 112 scheduled for the same lamella 110 at end joints 114. The joints 114 are glued and crowded together, and transferred to the lamella storage and retrieval section 50, where the glue is allowed to dry and cure for a period of time, and thereafter the lamella is machined to remove inconsistencies. At the scheduled time, all glued and cured lamellas 110 scheduled for a given end product beam 100 are retrieved from storage, indexed, glued to the adjacent lamella, pressed together, and finally machined thereby forming the end product beam 100.

In the grading line 20, the lumber is rolled on a conveyor 28 that may be moving at about 300 meters per minute and passed under a camera 22 located above the conveyor 28. The camera 22 looks for imperfections like knots, pitch pockets, cracks, and wane, which is the presence of bark or the absence of wood at the board's corners. The camera 22 may be typically a photographic or video capable video scanning camera or optionally a combination of one or a plurality of cameras in conjunction with one or a plurality of X-ray technology sensors to identify defects not only on the surface of wood being processed according to the processes of the present disclosure, but also defects hidden within a wood board or pieces of wood being processed according to the processes of the present disclosure. The camera 22 is electrically connected to a computer which generates a grade for the lumber based on the number and concentration of the imperfections and provides cut locations for the lumber for the cross-cut section to implement. The lumber is serialized and the grade and cut locations are printed onto the board with a laser or inkjet printer on the line, and the lumber is placed into bins 26 that are separated into their respective grades.

When the scheduler deems a certain grade of lumber necessary for a given glulam, the appropriate bin 26 is brought over to the cross-cut line 30. Pieces of lumber are pulled from the bin 26 and staged to be cut by a cross-cut saw 32. A reader may be coupled to the line at location 33 to read the lines printed on the boards 112 by the grading line. The reader is electrically coupled to the controlling computer system(s) of the present disclosure and the cut locations are then written to a database within the system. The computer systems of the present disclosure may be mobile computing devices, one or more server system, or a desktop computer system where the computer system typically includes at least one input/output device configured to receive input from a user and provide output to a user, such as a mouse, stylus or touchscreen display; a processor coupled to the input/output device; and a memory subsystem coupled to the processor, the memory subsystem coupled to the processor, the memory subsystem storing code that is responsive to input from the user that instructs the processor to perform steps based upon the user selections. The lines printed on the boards 112 are typically a photoluminescent ink line.

Figure 5A:
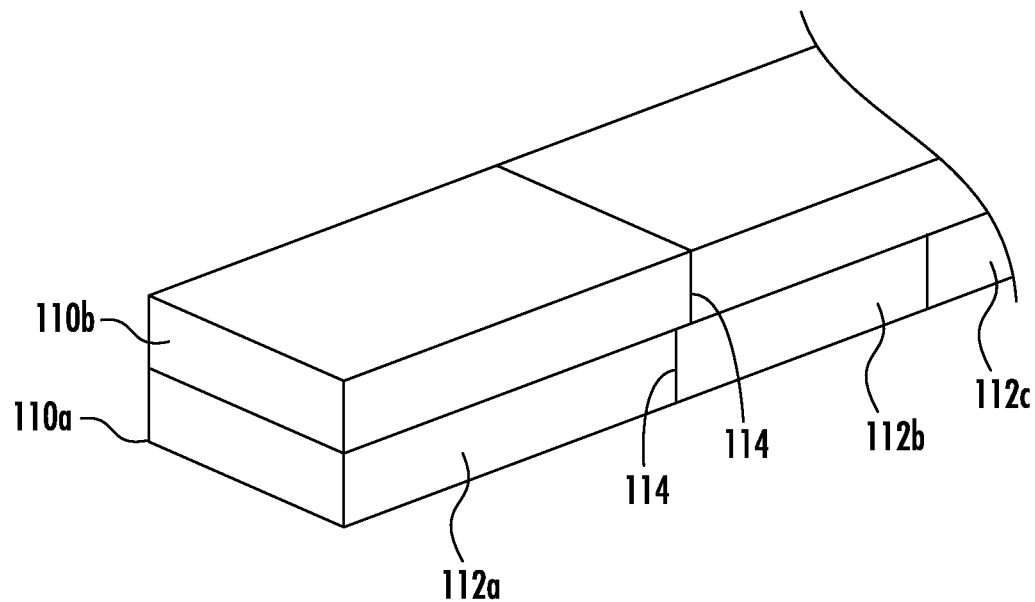
FIG. 5A is a perspective view showing the joint lines of a portion of the glulam according to an aspect of the present disclosure.
Figure 5B:
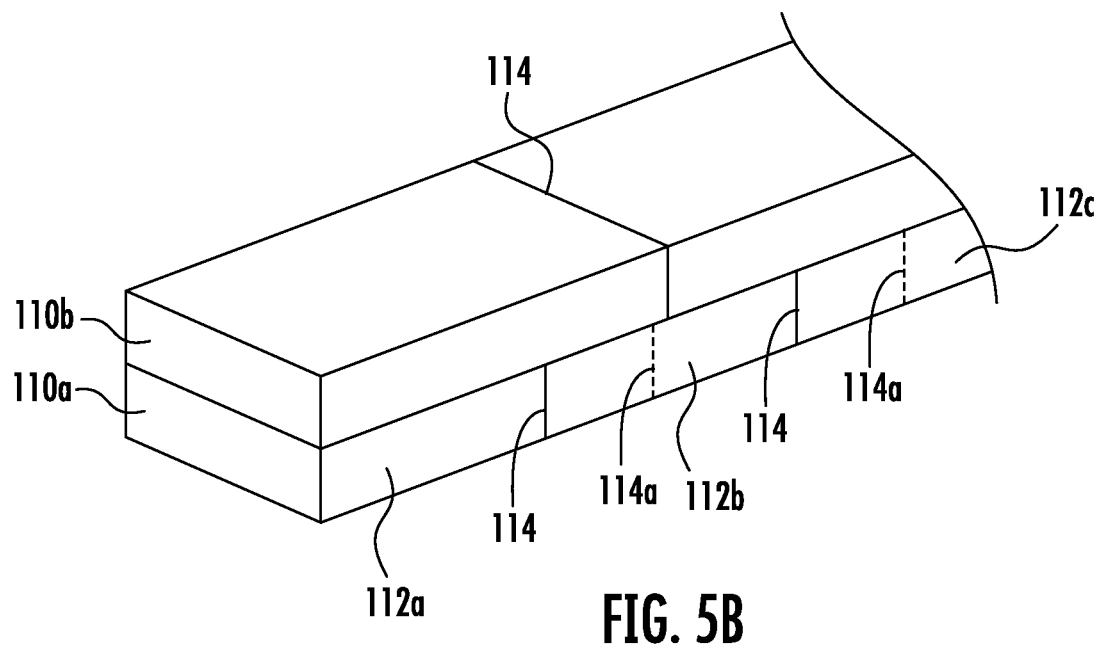
FIG. 5B is another perspective view showing the joint lines of a portion of the glulam according to an aspect of the present disclosure.

Looking at FIGS. 5A and 5B, the overall system of the present disclosure may compare adjacent lamellas in the given order to the measured lines on the boards before they are cut by the cross-cut saw 32. If the comparison, which is typically done by one or more computer system of the present disclosure, shows/deems that adjacent lamellas may have joint locations 114 that will be closer than the predetermined distance, the boards may be cut shorter than what the grading line printed on the board itself indicates in order to move at least one of the joint locations to meet the distance requirement between joints in lamellas thereby creating a strong composite wood beam in a continuous process.

For instance, FIG. 5A shows what may result in a glulam with raw boards cut into individual pieces of wood 112 that are typically lumber boards at the cut lines printed from the grading line 20 as discussed above. Based on data received on the length of the board, the system may predict that the joint between boards 112a and 112b in lamella 110a may be too close to the joint line 114 from the lamella 110b right above it. In this case, looking at FIG. 5B, the computer system(s) of the present disclosure that are in wired or wireless signal communication with at least the cross cut saw 32 and optionally other elements of the woodworking line(s) instruct(s) the cross-cut saw 32 to cut board 112a shorter such that the joint lines 114 in lamella 110a are sufficiently separated from the joint lines 114 in lamella 110b. The system then recalculates the predicted joint locations 114 from the rejected joint locations 114a for the remainder of the lamella. The length of lumber that could have been used but for the change in joint locations may then be discarded or placed back in the system for use in a later glulam.

The cross-cut saw 32 cuts the lumber at or near the cut location printed on the grading line 20. The cross-cut saw 32 is electrically connected to the scheduler and the pieces of wood 112, typically lumber, may be cut shorter than what was printed on the lumber on the grading line in order to adjust the joint line location 114 within a given lamella 110. The pieces of wood 112, typically hardwood lumber boards, are staged on a staging grate 34, and then sent to a machining station 36 where the leading edge is machined and glued, and finger joints are machined and water or primer is added to the trailing edge.

The now-machined and prepared pieces 112 are crowded together at a crowding station 60 forcing the finger joints 114 of different pieces of wood 112 together forming a lamella 110. The lamella is then sent through a flying saw 38. As the lamella 110 is sent down the flying saw conveyor 62, the flying saw matches the speed of the lamella and cuts the lamella to the correct length for the scheduled glulam 100.

From the cross-cut line 30 the now assembled lamella 110 is sent to the finger jointing line 40. On the finger jointing line 40 a photocell 64 is electrically connected to the computing system(s) of the present disclosure and measures the length of the lamella 110 and re-measures the joint locations 114 for verification and adjustment purposes and provides the data on the measurements for each lamella to the computer system's database used in connection with the overall systems and woodworking devices of the sections of the overall line of the present disclosure. The relative locations of the joints 114 within each lamella are constantly measured and compared to a predicted relative location from the system and electrically sent to the system via a wired and/or wireless network system within the production facility and potentially outside the facility in the rare instance when a computer system for controlling the processes of the present disclosure might be located remote from the manufacturing location producing the wood composites of the present disclosure.

Figure 6:
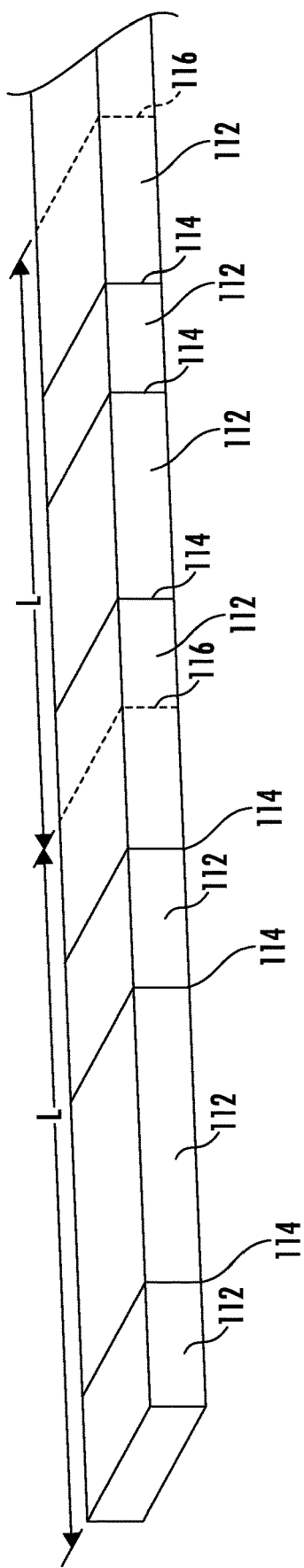
FIG. 6 is a perspective view showing the joint lines for a lamella of the glulam of an embodiment of the disclosure.

As shown in FIG. 6, lamellas are manufactured by combining many pieces of pieces of wood 112, typically lumber, into very long, conceivably endless length pieces. The very long lamellas are then cut to the proper length L at cut line 116 by the flying saw 38. After the flying saw 38 a control system is implemented to ensure that the predicted lengths l, and by extension the locations of the joints 114, are where they should be.

Figure 7:
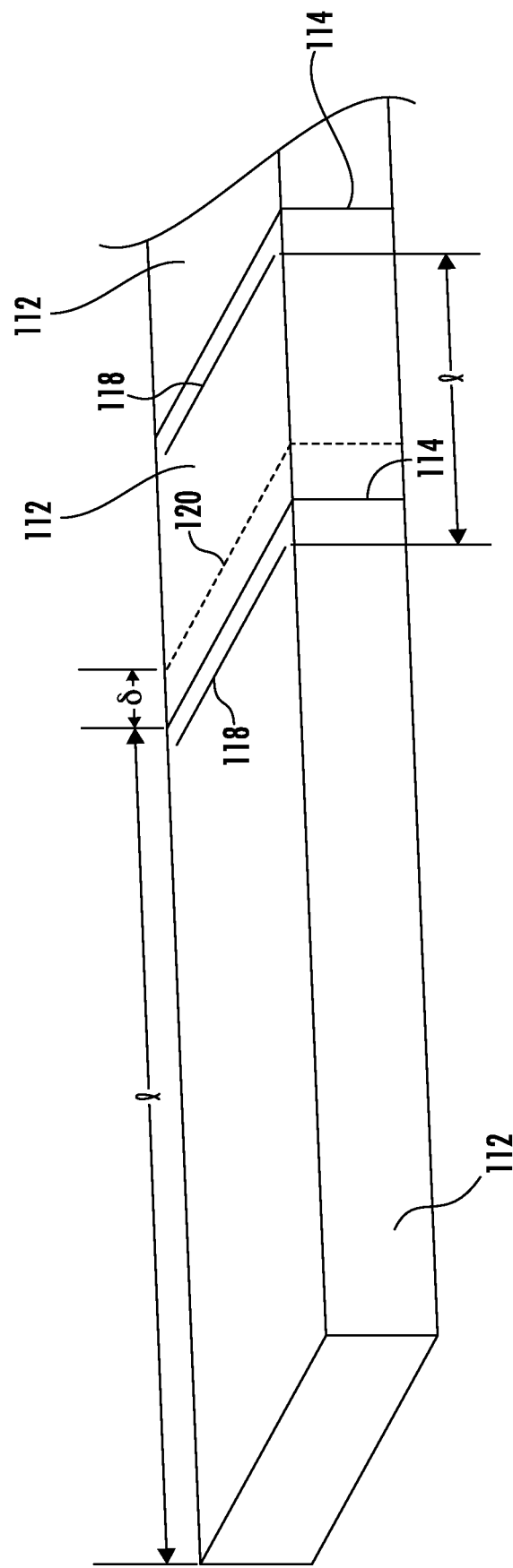
FIG. 7 is a perspective view showing the error of the joint lines for a lamella of the glulam according to an aspect of the present disclosure.

Looking closely at FIG. 7, the control system compares the predicted joint location 120 and compares to the actual joint location 114, calculating a difference 8. The difference 8 is compared to a predetermined error tolerance, and if it is larger than the predetermined error tolerance, then adjustments to the cross-cut saw may be made. Typically, a single location that is out of tolerance will not incur a correction, but if the system calculates that a trend toward one way or another is creeping into the measurements, then the system can correct this drift at the cross-cut saw automatically. Typically, these errors and the allowed tolerances are on a very small scale so as to ensure the joint locations remain within a very tight window and the entire process remains in very tight control. Typically, these adjustments and measurements are smaller than can be sensed or seen with the human eye.

In an embodiment, because the actual joint location may be difficult to measure, a trailing line 118 may be added to the pieces of lumber 112 before they are joined. This line may be some sort of photoluminescent line added by an inkjet printer or the like. The trailing line 118 is typically added a standard distance from the trailing end of the piece of lumber 112. The trailing line 118 may then be used as a proxy for the actual joint location 114. The trailing line of an upstream piece of lumber 112 is measured back to the trailing line 118 of a downstream piece of lumber 112 and this is used as a proxy to measure the actual relative locations of the joints 114. Of course, it should be known that the line may also be placed a standard distance from the leading edge of the piece of lumber as well.

Figure 8:
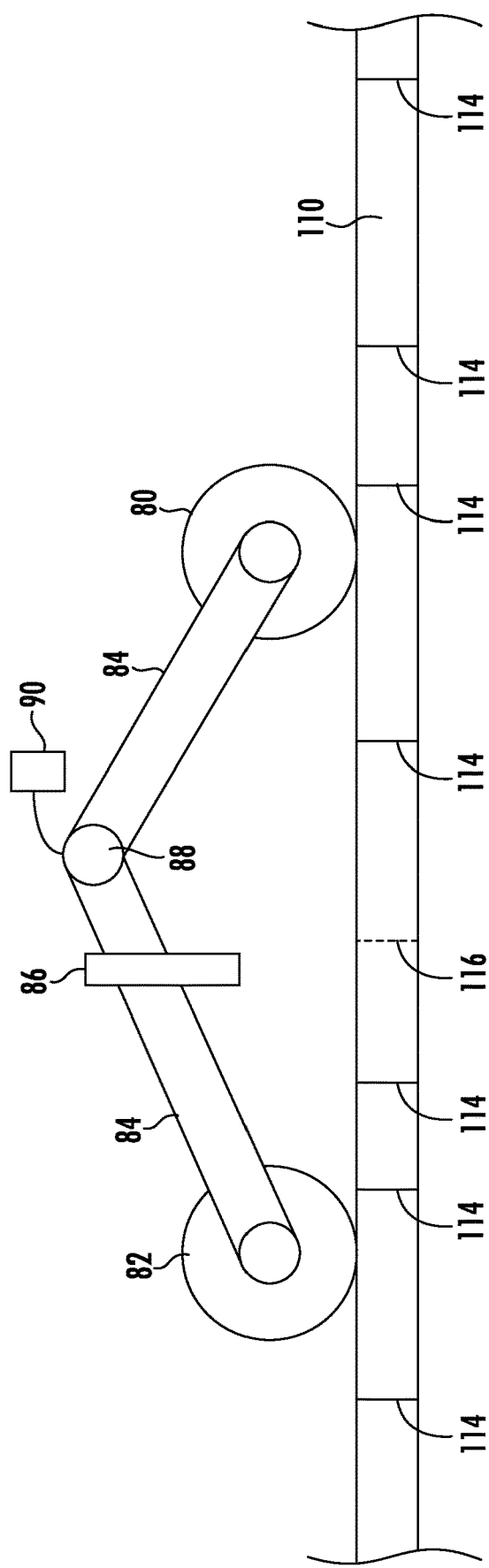
FIG. 8 is a side view of the sensing assembly for sensing the relative locations of the joint locations for a lamella of the glulam according to an aspect of the present disclosure.

As shown in FIG. 8, a control system(s) typically used according to the present disclosure includes a leading wheel 80, a trailing wheel 82, and a photocell 86. The leading wheel 80 and the trailing wheel 82 may be connected to a shaft 88. The shaft 88 may be electrically coupled to an encoder 90 which senses and electrically transforms the number of rotations of the shaft into the length of the lamella 110 that has passed. The photocell 86 senses when each of the joints 114 passes (or uses the trailing line 118 as a proxy as described in detail above) and combines this information with the distance information from the encoder to generate a relative location of each joint from the joint previous. The system then compares each of these locations 114 to the predicted location 120 and generates an error δ. The control system may also include or instead include a visual joint location reader that does not utilize a system as described herein using printed lines, typically with photoluminescent ink, but instead performs only a visual inspect of the joint itself.

Using this process, the system may alert users (human operators) that a piece of lumber 112 may have been knocked off the track at some point as well. As described above, the errors the system is tracking are very small, smaller than a typical human eye can readily detect. So, if the system shows a very large error, the line may briefly stop to allow a user to inspect what may have happened. For instance, a board may have been inadvertently knocked off of the line, changing the order of the boards into the jointing line. The sensed joint locations between the boards before and after the missing board may be many inches or feet different than what was predicted by the system, which may be regarded not as drift of the cutting and jointing system but rather a major break in the continuity of the process, and the system may alert a user to this error and/or conceivably automatically stop the overall system without human interaction.

From the finger jointing line 40 the lamella is conveyed to the lamella storage and retrieval section 50 (See FIG. 4). The lamella storage and retrieval section 50 includes an elevator 52 (also called a "lamellavator") that raises the lamellas 110 very high and brings them back down over the course of about 9 minutes to allow the glue to dry and cure. The now dry lamella 110 is then machined into a single layer that is appropriate to include in a glulam 100 or a split-lam 1100. The machined lamella is then put into a storage rack 54, which is typically at least about 5 stories tall, and prepared for inclusion in the glulam 100.

When producing a split-lam beam using the systems of the present disclosure, the process remains similar. The difference may be that the lamellas are glued side-to-side in the finger jointing line as well as end-to-end, providing the extra width "W" (See FIG. 2A) that may not be achieved using wood pieces 112 (shown as lumber boards in FIGS. 2A and 2B) having a width "w" less than the width "W". When producing a split-lam beam, the lamellas are compared with lamellas that are laterally adjacent in addition to vertically adjacent. The laterally adjacent joined lamellas should not have a joint that is aligned with the joined lamellas immediately above or below in the split-lam beam being constructed, but instead there should be a distance, typically at least six inches, laterally between the lengthwise joints in the split-lam beam.

FIG. 9 shows an example of a glulam 100 and a split-lam 1100 that is to be prepared on the line. When an order is input into the system by a user, the system calculates the grade, length, thickness, and specific lamellas 110 necessary to fill the order. The system then creates a work order 72 that may be displayed on a work order screen 70 of a user's computer system. Within each work order 72, there may be listed the different lamellas necessary to create the glulam 100 or the split-lam 1100. In the examples shown, the dimensions shown are in mm, but it should be known that any other dimensions may be used such as inches. In the examples, each glulam and split-lam is created by combining eleven lamellas 110.

As shown in the first column 74 of the example, the highest grade ("T1" as shown, may also be "A") lamellas are on the outside of the glulam 110, and the grades are reduced toward the middle of the glulam 100. Of course, it is possible to use higher grade wood lamellas throughout the glulam or other wood composite to be formed as well. The system then calculates where the joints 114 will be within each lamella, and ensures that the joints 114 will be at least six inches between adjacent lamellas. This planning typically creates the predicted joint locations within the wood composition production database.

For example, in the first example glulam 100 in FIG. 9, the top grade "T1" lamella will be lamella ID 1001. The system retrieves the joint locations 114 of lamellas 1001 and 1002 from the database of the system and compares the joint locations 114 of each lamella to ensure at least six inches of separation. The system then retrieves the joint locations 114 of lamella 1003 and compares the joint locations of lamellas 1002 and 1003 to ensure at least six inches separation. In this way, each lamella 110 may be manufactured in the correct order or picked from the lamella storage and retrieval section 50 to ensure proper separation and glulam integrity.

Similarly, a split-lam work order is shown in column 76. In a split-lam beam 1100, proper separation of joints 114 must be ensured laterally as well as vertically. Each lamella 110 is compared to the lamella next to and below (or above) it to create a structurally strong split-lam.

For example, in the first example split-lam 1100 in FIG. 9, the top grade "B" lamella will be lamella ID 2002. The system retrieves the joint locations 114 of lamella 2002, 1001, and 1003 and compares the joint locations 114 of each lamella 110 to ensure at least six inches of separation. The system then retrieves the joint locations 114 of lamella 2003 and compares the joint locations of lamellas 1002 and 1004 to ensure at least six inches of separation. In this way, each lamella 110 may be manufactured in the correct order or picked from the lamella storage and retrieval section 50 to ensure proper separation and split-lam integrity.

Figure 10:
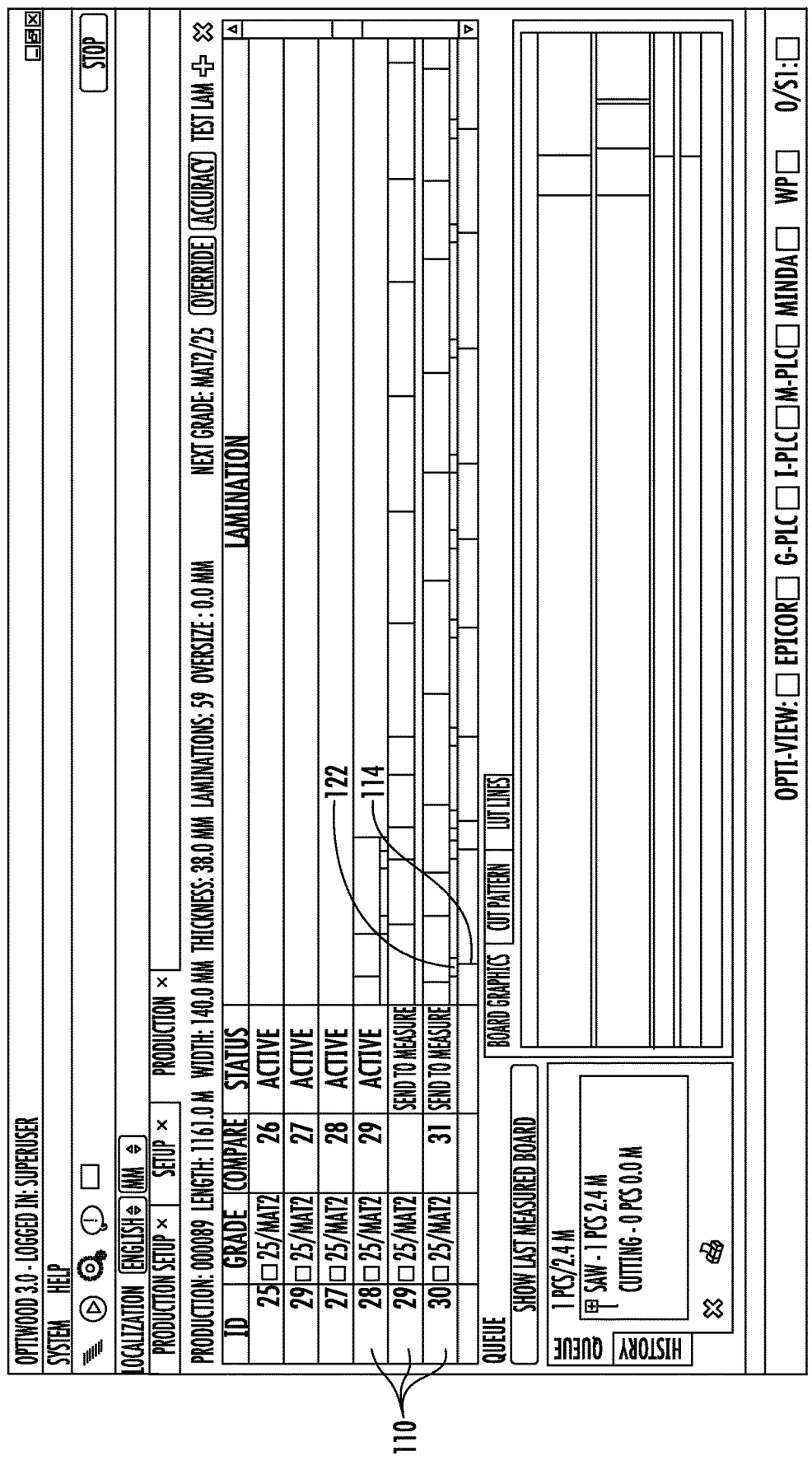
FIG. 10 is an example screenshot of a graphical real-time representation of the joint locations of the glulam according to an aspect of the present disclosure.

FIG. 10 shows a system screen displaying the lamellas 100 as they are cut and joined. Each lamella 110 may be shown graphically to a user via a graphical user interface associated with either a mobile computing device with a touch sensitive display or a server or desktop computer system with an associated display in signal communication with the other hardware of the computing device. Each lamella may be graphically shown with the calculated joint locations 114 before they get to the photocell 64. Also shown is the adjacent lamella 110 that is compared to the instant lamella 110. In this case, each lamella is compared to the one above. The joint lines 114 and necessary separation 122 is shown for easy reference. This ensures the two-way separation necessary to ensure glulam integrity because each interior lamella 110 is compared to the one above as the one above is analyzed. In other words, lamella ID 28 is shown as compared to lamella ID 29 in the COMPARE column of the display screen and within the database. Lamella ID 28 is then compared to lamella ID 27 as lamella ID 27 is analyzed in the next process. Thus, lamella ID 28 is compared to both lamella 29 and 27 both despite only showing that it is compared to a single lamella.

In the embodiment of a split-lam beam where lamellas are adjoined side-to-side, if a beam wider than twelve (12) inches is needed or desired for construction, the overlap laterally (horizontally) is also tracked to ensure automated construction without the direct use of human hands or direct human measurement during the construction process thus achieving a rapidly produced and structurally durable and strong split-lam beam.

Figure 11:
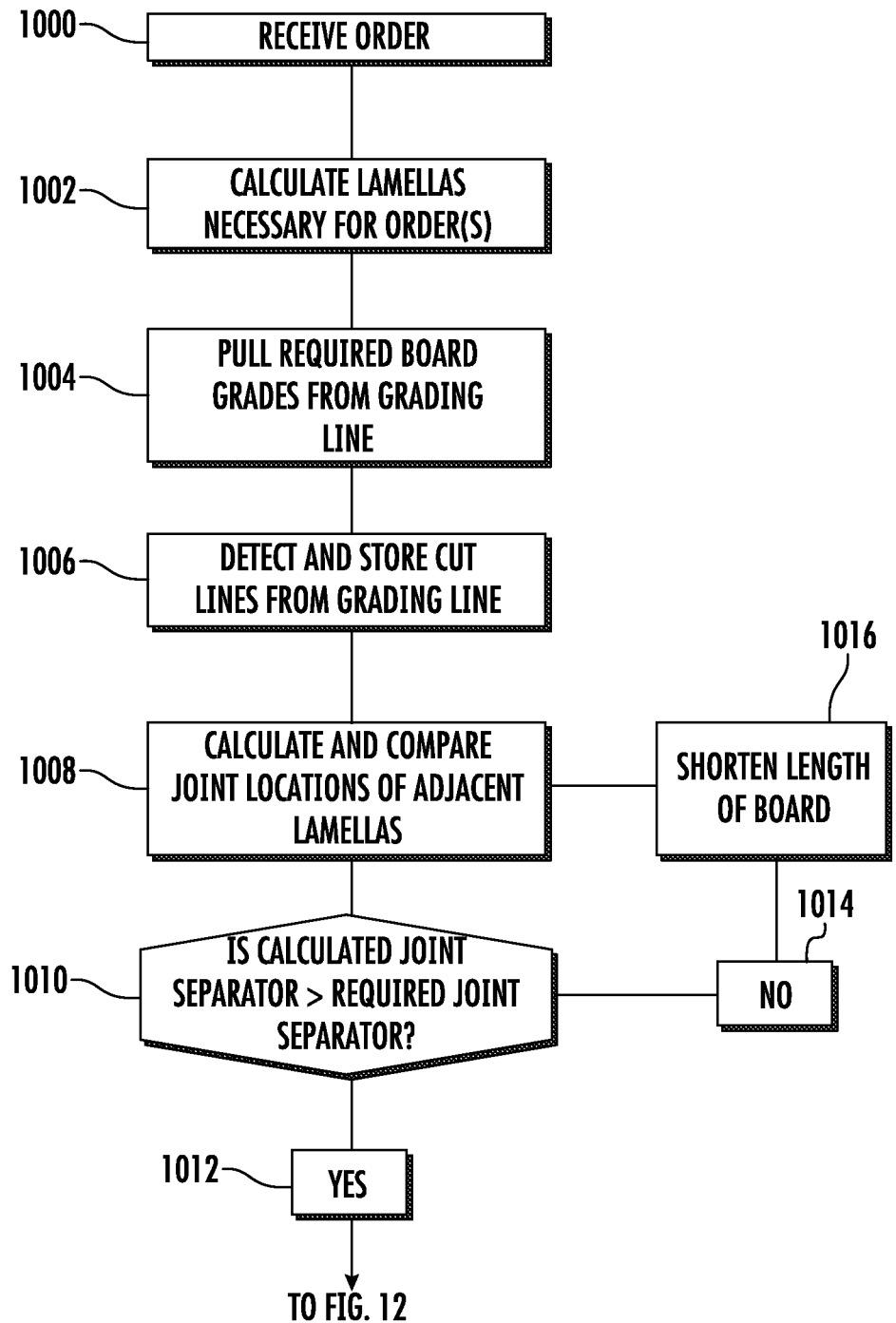
FIGS. 11-12 are process flow charts showing how a system of the present disclosure minimizes waste and keeps the continuous glulam or split-lam manufacturing process under control.
Figure 12:
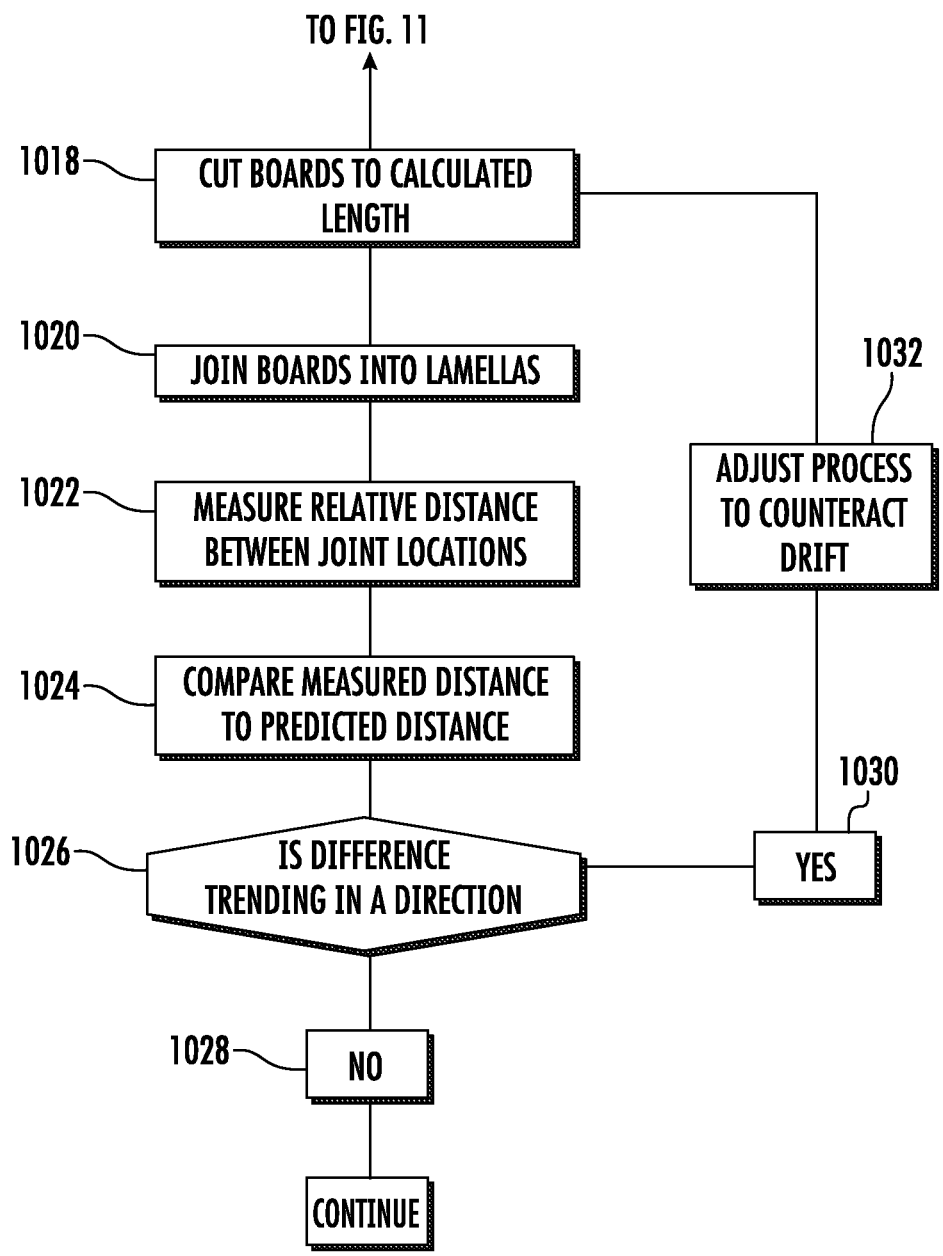

FIGS. 11 and 12 show the process by which the system ensures that the joints 114 are sufficiently separated, and how the systems of the present disclosure continually and automatically keep the process in control and prevent line drift that could allow for the joint locations to creep closer and closer thereby creating a less than optimal wood composite. At step 1000, an order is received into the system. At step 1002, the system calculates the lamellas necessary to manufacture the glulam or split-lam beam. At step 1004, the system then pulls properly graded boards from grading line to the cross-cut line. On the cross-cut line, the printed cut lines from the grading line are detected and stored in the database of the system at step 1006. The joint locations of each lamella are then calculated and predicted by the system at step 1008. At step 1010, the joint locations of adjacent lamella according to the schedule calculated by the system are then compared to a required separation distance. If the separation is greater than required for each lamella, the boards are sent to the cross-cut saw. If the separation is not greater than required, the system shortens the cut length of at least one board and goes back to step 1008 to recalculate and compare the joint locations.

Once the system verifies that proper separation is achieved, the boards are cut by the cross-cut saw at step 1018. The boards are then joined into lamellas at step 1020, cut to the proper length for the glulam, and then the relative distances between joint locations is measured at step 1022. This distance is compared to the calculated or predicted distance from the system, and the difference compared with an allowable error. At steps 1030-1032, if the distance is greater than the allowable error, the process may be adjusted to counteract any drift that is measured. Typically, this includes an automatic adjustment by the system of the location of the cuts by the cross-cut saw that is in signal communication with the computer system(s) of the present disclosure. These adjustments may be continuous and very small so as to be undetectable by a human eye. If the adjustment of the cross-cut saw does not bring the joint locations back within the allowable error, a user may inspect other areas of the line and adjust accordingly.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the scope of the present disclosure. The upper and lower limits of these smaller ranges may independently be included in the smaller ranges, and are also encompassed within the scope of the present disclosure, subject to any specifically excluded limit in the stated range. Where the stated range includes one or both of the limits, ranges excluding either or both of those included limits are also included in the scope of the present disclosure.

What is claimed is:

1. A method of making a composite wood beam comprising the steps of:
   joining a plurality of individual wood boards in a continuous machining process to form a plurality of lamellas having at least one joint;
   creating a plan for (1) a production of the plurality of lamellas having at least one joint and an assembly of the plurality of lamellas into the composite wood beam a using a computer system, wherein all joints of either vertically adjacent lamellas or both vertically and horizontally adjacent lamellas are at least a predetermined distance from one another;
   using the computer system to automatically regulate a location of the at least one joint of a lamella by determining whether or not a location of a joint of a given lamella of the plurality of lamellas should be adjusted and, when an adjustment of the location of the joint of the given lamella of the plurality of lamellas is determined to be needed, using the computer system to communicate with a cross cut saw that cuts the plurality of individual wood boards used to form the lamella to adjust the location of the joint of the given lamella of the plurality of lamellas produced by shortening a length of one or more of the plurality of individual wood boards to a shorter length than originally planned in the plan for the production and thereby revise the plan to ensure that at least one joint of either (1) vertically adjacent lamellas or (2) both the vertically adjacent lamellas and horizontally adjacent lamellas are at least a predetermined distance from one another; and
   assembling the plurality of lamellas to form the composite wood beam.

2. The method of making a composite wood beam of claim 1,
   wherein each of the plurality of individual wood boards used to form a lamella have the same or substantially the same cross-sectional shape and substantially the same or the same cross-sectional dimensions.

3. The method of making a composite wood beam of claim 2, wherein each of the plurality of individual wood boards have a cross-sectional dimension of 1.5 inches in height and a width of from two inches to 12 inches and wherein the composite wood beam is a glulam beam and the predetermined distance between joints in the glulam beam is at least six inches.

4. The method of making a composite wood beam of claim 1, wherein the step of assembling the plurality of lamellas to form the composite wood beam comprises using an adhesive to adhere each of the plurality of lamellas of the composite wood beam produced together and wherein the plurality of individual wood boards are finger jointed together to form the plurality of lamellas and wherein the composite wood beam is a glulam beam or a split lam beam.

5. The method of making a composite wood beam of claim 4, wherein the computer system stores and establishes the location of the joints of the composite wood beam to be produced in a database prior to the step of assembling the plurality of lamellas to form the composite wood beam.

6. A method of producing a composite wood beam using a continuous wood processing subsystem comprising the steps of:
   analyzing a plurality of wood boards using a visual scanning camera system yielding a plurality of analyzed wood boards;
   transferring the plurality of analyzed wood boards to a cross-cutting saw;
   calculating and automatically recording in a database of a computer system locations of joints between the plurality of analyzed wood boards to be used to produce an initial lamella prior to cutting the plurality of wood boards;
   cutting each of the plurality of analyzed wood boards of an initial set of boards with a first saw to cut out any imperfections, where present, in each of the plurality of analyzed wood boards and produce sections of wood boards to be used to produce the initial lamella having a predetermined length corresponding to a predetermined length of the composite wood beam;
   calculating and automatically recording in the database of a computer system the locations of the joints between the sections of wood boards to be used to produce a subsequent lamella that will be positioned adjacent the initial lamella in the composite wood beam;
   comparing the locations of the joints of the initial lamella to the locations of the joints of the subsequent lamella prior to cutting an imperfection from the sections of wood boards to be used to produce the subsequent lamella;
   cutting each of a plurality of analyzed boards of a subsequent set of boards with the first saw to cut out any imperfections, where present, in each of the plurality of analyzed boards of the subsequent set of boards and produce sections of wood board to be used to produce the subsequent lamella of a predetermined length corresponding to a predetermined length of the composite wood beam that will be positioned adjacent the initial lamella wherein the subsequent lamella of a predetermined length has joints between the sections of wood board of the subsequent lamella and wherein the sections of wood board used to produce the subsequent lamella are analyzed and automatically cut such that the joints between the sections of wood board to be used to produce the subsequent lamella are not within a predetermined distance from the joints between the sections of wood board of the initial lamella; and
   adhering the initial lamella with the subsequent lamella to produce the composite wood beam.

7. The method of claim 6 further comprising the steps of:
   transferring the sections of wood board to be used to produce the initial lamella to a finger jointing system;
   cutting finger joints into the sections of wood board to be used to produce the initial lamella;
   joining the finger joints of the sections of wood board to be used to produce the initial lamella to form joined sections that together form the initial lamella and the joined sections have a length of at least the predetermined length;

determining if the joined sections have a length that is longer than the predetermined length, wherein if the joined sections have a length that is longer than the predetermined length, cutting a trailing end portion of a final section of the sections of wood board to be used to produce the initial lamella with a second saw to create the initial lamella at the predetermined length;

transferring the sections of wood board to be used to produce the subsequent lamella to a finger jointing system;

cutting finger joints into the sections of wood board to be used to produce the subsequent lamella; and joining the finger joints of the sections of wood board to be used to produce the subsequent lamella to form joined sections that together form the subsequent lamella and the joined sections have a length of at least the predetermined length and wherein the sections of wood board used to produce the subsequent lamella comprise the trailing end portion of the initial lamella if the initial lamella is cut to a predetermined length by the second saw.

8. The method of claim 7 further comprising the step of adjusting a location of where the first saw will cut the plurality of analyzed boards of a subsequent set of boards such that the location of the joints between the sections of wood boards of the subsequent lamella shift to ensure the joints between the sections of wood boards of the subsequent lamella and the initial lamella are not within the predetermined distance from one another.

9. The method of claim 8, wherein the step of positioning the initial lamella and the subsequent lamella adjacent to one another comprises placing the initial lamella and the subsequent lamella on top of one another or next to one another and wherein the method further comprises the steps of measuring the locations of the joints of the initial lamella relative to one another to determine measured locations of the joints of the initial lamella and comparing the measured locations of the joints of the initial lamella to calculated locations of the joints of the initial lamella and determining a difference in length between the calculated locations and the measured locations of the joints and adjusting the location of the cut made by the first saw by the difference in length between the calculated locations and the measured locations of the joints.

10. The method of claim 9 further comprising the steps of using a printing device to place a printed line on each of the initial set of boards and the subsequent set of boards; and using a photocell sensor to scan the printed line and determine the measured joint locations after joining the finger joints of each section of the initial lamella and the subsequent lamella.

11. The method of claim 10, wherein the first saw is a cross cut saw and the second saw is a flying saw.

12. The method of claim 11, wherein each of the plurality of wood boards are printed with at least one printed line after the step of analyzing a plurality of wood boards of material using a visual scanning camera system yielding a plurality of analyzed wood boards.

13. The method of claim 12, wherein the plurality of analyzed wood boards are stored together by grade for form stored wood boards and wherein the method further comprises the step of retrieving a first grade of stored wood boards and transferring the stored wood boards to a conveyor that delivers the stored wood boards to the first saw and wherein the predetermined distance is at least six inches.

14. The method of claim 6, wherein the plurality of analyzed boards travel through the continuous wood processing subsystem at a rate of at least 150 feet per minute and continuously for at least 7 hours.

15. A method of producing a composite wood beam comprising the steps of:

analyzing a plurality of wood boards of material using a visual scanning camera system yielding a plurality of analyzed wood boards;

transferring the plurality of analyzed wood boards to a cross-cutting saw;

cutting each of the plurality of analyzed wood boards with a first saw to cut out any imperfections, where present, in each of the plurality of analyzed wood boards and produce sections of a first grade of wood board to be used to produce a first lamella of a predetermined length;

calculating and automatically recording in a database of a computer system, a location of joints between the sections to be used to produce the first lamella;

transferring the sections of the plurality of analyzed wood boards having the same grade to a finger jointing system;

cutting finger joints into the sections;

joining the finger joints of the sections to form joined sections that together form the first lamella and the joined sections have a length of at least the predetermined length;

wherein if the joined sections have a length that is longer than the predetermined length, cutting a trailing end portion of a final section of the first lamella with a second saw to create the first lamella at the predetermined length;

automatically recording in the database of the computer system the location of joints between sections used to produce a second lamella to be placed adjacent the first lamella and using at least one section of a second grade of wood to produce the second lamella; and adhering the second lamella to the first lamella using an adhesive and wherein none of the locations of joints between the sections used to produce the first lamella are within less than six inches of the locations of joints between the sections used to produce the second lamella.

16. The method of claim 15, wherein wood boards of a plurality of wood boards are used to produce the first lamella and the second lamella and printed with at least one printed line after the step of analyzing a plurality of wood boards of material using a visual scanning camera system yielding the plurality of analyzed wood boards.

17. The method of claim 16, wherein the plurality of analyzed wood boards are stored together by grade for form stored wood boards and the wood boards are solid wood lumber and not engineered wood boards.

18. The method of claim 17 further comprising retrieving a first grade of stored wood boards and transferring the stored wood boards to a conveyor that delivers the stored wood boards to the first saw.

19. The method of claim 18 further comprising the step of using a photosensor positioned above the conveyor to read the at least one printed line on any one of the plurality of wood boards and transmits a location of the at least one printed line and the length of the any one of the plurality of wood boards to the computer system which calculates a size of at least one portion of a wood board being read.

20. The method of claim 19, wherein the step of cutting each of the plurality of analyzed wood boards with the first saw to cut out imperfections, where present, in each of the plurality of analyzed wood boards and produce sections of a first grade of wood board to be used to produce the first lamella of a predetermined length comprises cutting each of the plurality of analyzed wood boards along each of the at least one printed line.

* * * * *